United States Patent [19]

Mettler-Friedli

[11] Patent Number: 5,299,881
[45] Date of Patent: Apr. 5, 1994

[54] ASSEMBLY OF A CYLINDRICAL BODY MADE TO FINISHED DIMENSIONS

[76] Inventor: Karl Mettler-Friedli, Oberfeld 693, Triesen, Liechtenstein

[21] Appl. No.: 842,125
[22] PCT Filed: Jul. 17, 1991
[86] PCT No.: PCT/EP91/01340
  § 371 Date: May 7, 1992
  § 102(e) Date: May 7, 1992
[87] PCT Pub. No.: WO92/02739
  PCT Pub. Date: Feb. 20, 1992

[30] Foreign Application Priority Data

Jul. 27, 1990 [CH] Switzerland ............ 2493/90

[51] Int. Cl.⁵ ............................. F16H 53/00
[52] U.S. Cl. ..................... 403/274; 403/273; 403/242; 74/567; 29/432.1
[58] Field of Search ............. 403/273, 274, 300, 378, 403/379, 242, 263, 284, 375; 74/567; 29/516, 517, 432, 432.1, 432.2; 428/556, 553

[56] References Cited

U.S. PATENT DOCUMENTS

| | | | |
|---|---|---|---|
| 683,656 | 10/1901 | Moyle | 403/274 |
| 1,329,479 | 2/1920 | Savon | 403/274 |
| 1,949,678 | 3/1934 | Doran | 403/378 |
| 1,983,867 | 12/1934 | Miller | 403/378 |
| 3,603,624 | 9/1971 | Attermeyer | |
| 4,513,488 | 4/1985 | Arena | |
| 4,523,872 | 6/1985 | Arena | |
| 4,631,973 | 12/1986 | Eley | 403/273 |
| 4,675,204 | 6/1987 | Nicoll | 427/551 |
| 4,681,642 | 7/1987 | Nonoyama | 74/567 |
| 4,704,074 | 11/1987 | Kawamoto | 403/273 |
| 4,767,233 | 8/1988 | Erickson | |
| 4,809,562 | 3/1989 | Bendoraitas | 74/567 |
| 4,899,615 | 2/1990 | Matt | 74/567 |
| 4,905,538 | 3/1990 | Watanabe | 74/567 |

FOREIGN PATENT DOCUMENTS

| | | |
|---|---|---|
| 0119112 | 9/1984 | European Pat. Off. |
| 0178537 | 4/1986 | European Pat. Off. |
| 0211347 | 2/1987 | European Pat. Off. |
| 0222114 | 5/1987 | European Pat. Off. |
| 0354869 | 2/1988 | European Pat. Off. |
| 2914095 | 10/1980 | Fed. Rep. of Germany |
| 3128522 | 2/1983 | Fed. Rep. of Germany |
| 3232868 | 4/1983 | Fed. Rep. of Germany |
| 3247636 | 6/1984 | Fed. Rep. of Germany |
| 8426999 | 10/1984 | Fed. Rep. of Germany |
| 3711489 | 10/1987 | Fed. Rep. of Germany |
| 3738809 | 5/1989 | Fed. Rep. of Germany |
| 2623266 | 5/1989 | France |
| 63-169351 | 7/1988 | Japan |
| 0137317 | 5/1920 | United Kingdom |
| 0859327 | 1/1961 | United Kingdom |
| 1274419 | 5/1972 | United Kingdom |
| 2157399 | 10/1985 | United Kingdom |
| 2198377 | 6/1988 | United Kingdom |

Primary Examiner—Randolph A. Reese
Assistant Examiner—Anthony Knight

[57] ABSTRACT

The invention relates to an assembled camshaft requiring no further machining, onto which prefabricated cams which have free spaces in their internal diameter are pushed. They have a play-free transition fit during assembly. At least one collar for mounting additional fastening means is preferably provided at the edge of the cams.

23 Claims, 3 Drawing Sheets

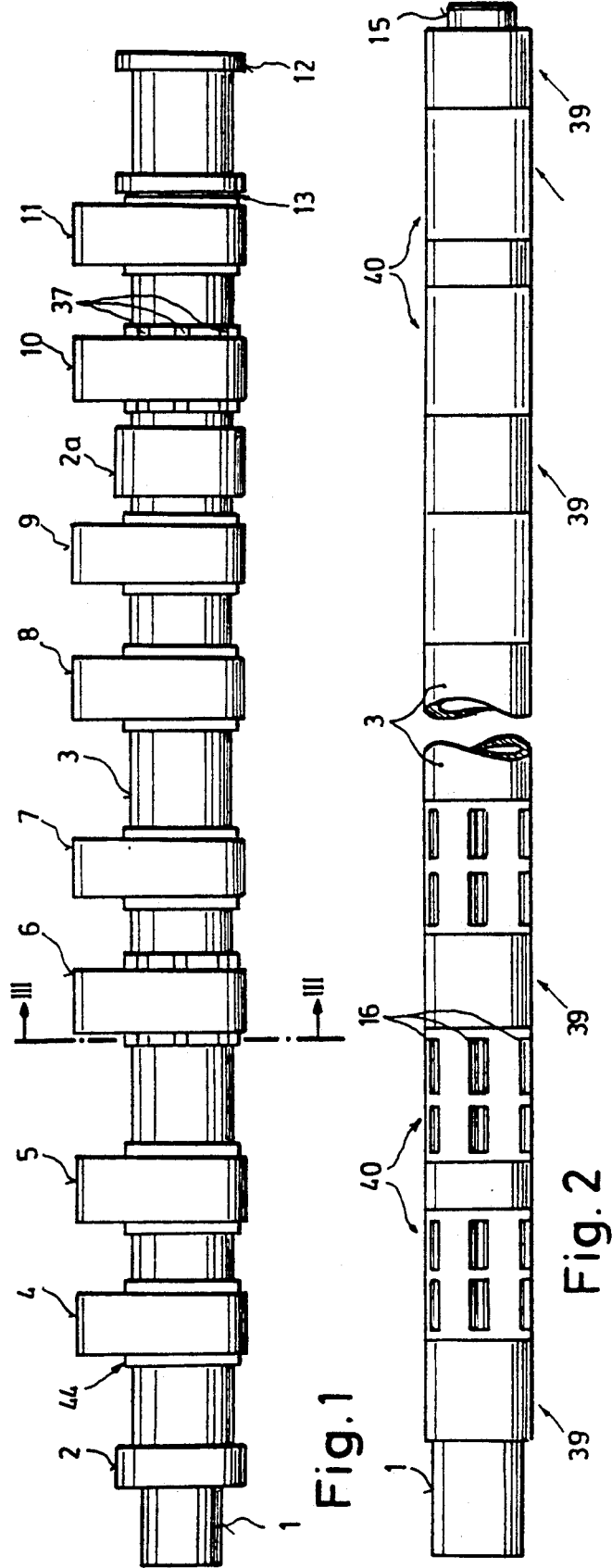
Fig. 1
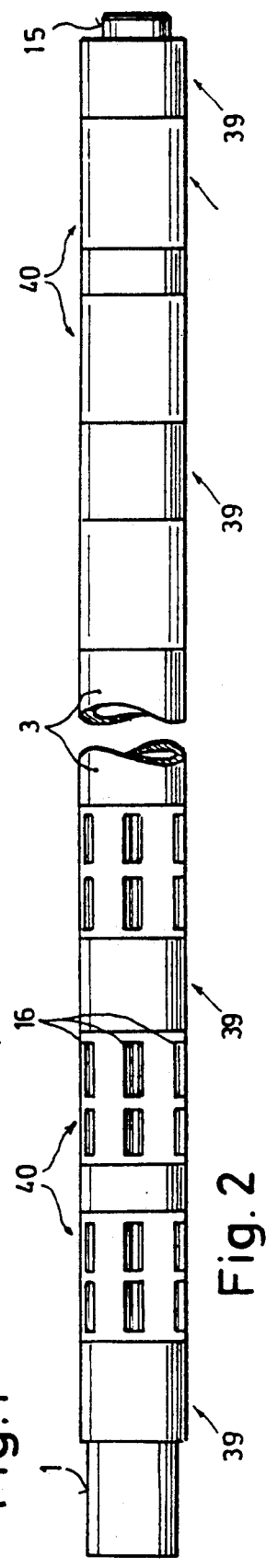
Fig. 2
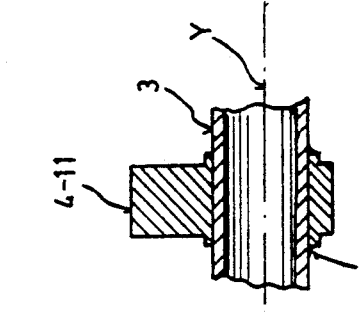
Fig. 3a  Fig. 4  Fig. 4a  Fig. 5
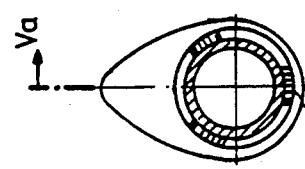
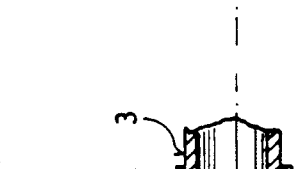
Fig. 3  Fig. 5a

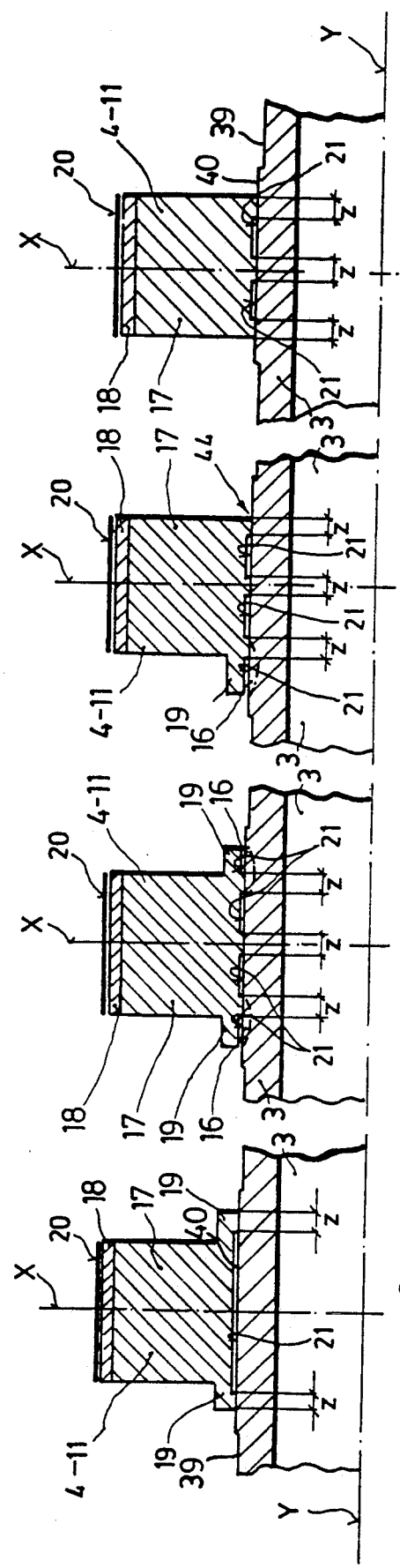
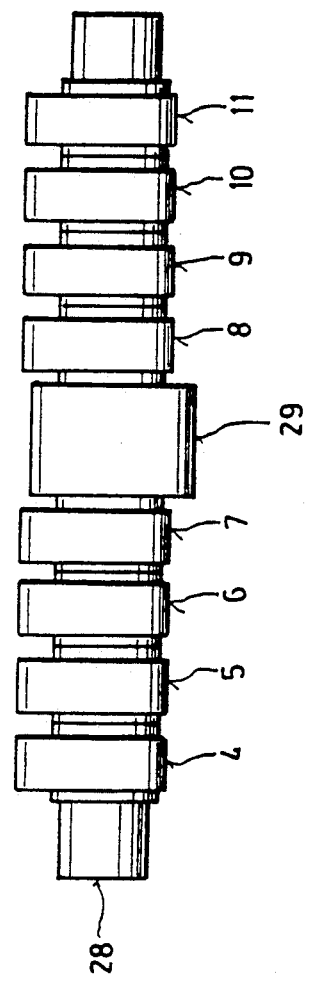

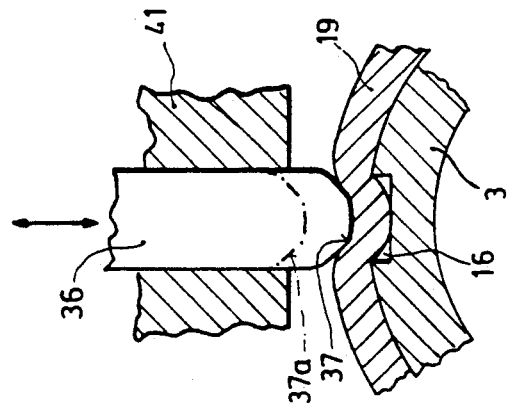
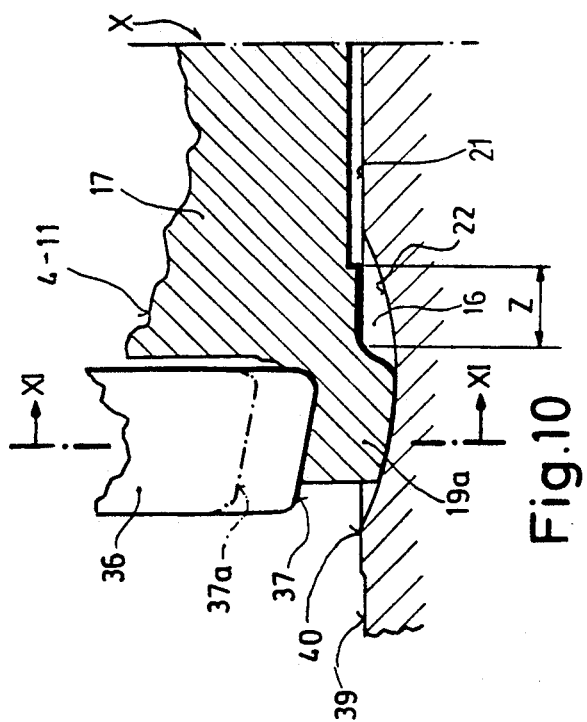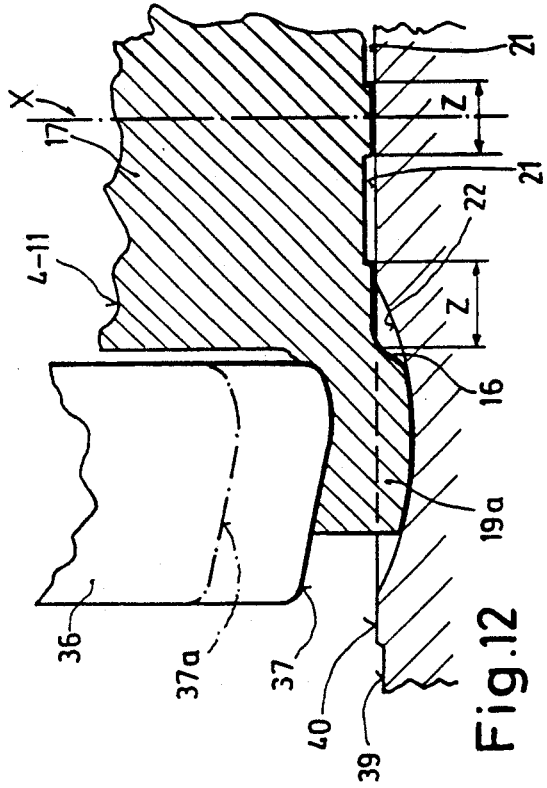

5,299,881

ASSEMBLY OF A CYLINDRICAL BODY MADE TO FINISHED DIMENSIONS

The invention relates to a connection of a shaft manufactured to final dimensions and at least one cam surrounding the shaft in an annular manner and manufactured to final dimensions and processes for manufacture thereof.

The statements below relate to a camshaft for controlling valves, such as those used in internal combustion engines. However, the invention does not relate only to camshafts but can also be used wherever production costs and quality advantages are involved.

BACKGROUND OF THE INVENTION

A camshaft must meet various requirements; it must have good flexural strength, torsional strength and fatigue strength, but in particular the cam must be hard-wearing. The counter-part in direct contact with the cam is differently designed depending on the engine. The pinion partners used today for the cam are tappets, drag levers and valve lifters, in which sliding friction occurs, and roller tappets and roller lifters in which a rolling movement occurs.

The high forces which occur in the drive system and which act on the pinion partners exert various pressures on the contact surfaces of the pinion partners, which may cause damage in the case of an unsatisfactory design of the pinion partners, in particular at their surface (pitting, abrasion, etc.).

In systems where there is a sliding movement between the pinion partners in addition to high pressure, it must be ensured that the sliding surfaces of the cam additionally have an adequate wear-resistant layer to prevent abrasion of the cam.

The cast iron or clear chill cast iron camshafts used today are designed as one piece. These components, which in principle are proven ones, have the disadvantage that there are high processing costs, in particular in the operations such as cam grinding, thermal treatment, alignment, etc. and high spoilage rates in production from the blank to the ready-to-install camshaft. Another disadvantage is the high weight of the camshaft designed as a solid shaft. Modern surface coating processes for reducing wear are unsatisfactory because of the price and for technological reasons.

Patent publications have disclosed that attempts have been made to replace the present one-piece cast iron or clear chill cast iron camshafts with a multi-piece steel camshaft. This version was intended in particular to achieve a weight reduction through the use of a hollow shaft (pipe). In certain constructions, lower production costs were also expected.

All known multi-piece camshafts have in common the fact that the cast blank of the one-piece camshaft is replaced with a multi-piece steel camshaft blank. In the case of the production costs, a certain saving is achieved in the machining costs. The expensive finishing of the end position, the bearing seat and cams is, however, still part of the existing production technology. Here too, surface coating processes for improving wear are unsuccessful for technological reasons (size, selective area).

All joining methods disclosed, i.e. the joining of the cam to the shaft without torsion and axial displacement, have the disadvantage that, owing to the joining technology chosen, the required final geometric state of the mounted camshaft is not achieved without further machining.

The prior publication DE 3717534 A1 describes a constructed camshaft in which a relatively uncontrolled pressure build-up takes place in the cam as a result of widening the hollow shaft from inside—as found in practice—and acts as far as the cam surface by transmission via the points adjacent to the shaft, and irregularities, for example central indentations, may form there. This important disadvantage on the one hand prevents the use of cams machined to final dimensions and on the other hand prevents the use of novel production and surface coating processes.

A possible method for producing the cams and hollow shaft to final dimensions, including wear layer, prior to assembly would permit a considerable reduction in the unit costs compared with the conventional cast iron camshafts and also compared with the multi-piece assembled camshafts.

A connection must ensure that, in addition to a secure attachment for transmission of the resulting torsional and axial forces, the components manufactured to final dimensions, in particular cams and shaft, do not, as a result of joining, suffer any dimensional changes which impairs their function. The aim is to ensure that the camshaft is ready to install.

SUMMARY OF THE INVENTION

The object of the invention is thus to permit a connection which enables the components to be manufactured to final dimensions in a wide range of cam materials, such as steel and light metal to be used for the cams and modern coating methods to be employed for producing the wearing layer on the surface of the cam. Furthermore, an optimal functional design, in particular of the cam with respect to its pinion partner, for example tappets or roller tappets, should be permitted.

This object is achieved for the first time in a satisfactory manner by the following features: the cam has an inner bore with at least two axially separated annular zones for providing a play-free transition fit on the shaft. The inner zones are separated from one another by at least one free space in the inner bore. The space is arranged symmetrically with respect to the radial central plane of the cam. The features mentioned according to the invention permit problem-free mounting of the cams on the shaft, ensure that said cams sit there exactly flush and substantially without tension and that any further suitable fastening measures at the cam edge have scarcely any further disadvantageous effect on the cam or shaft geometry and that undesired tensions in the cam and/or in the shaft are avoided.

The zones which are in direct contact with the shaft have a play-free transition fit which, for the purposes of the invention, is understood as meaning a fit which just permits the cams to be pushed on without special measures and without leading to significant destruction of the cam inner bore or of the shaft, and where, after pushing on, the cams fit firmly without further special fixing measures so that they are nonrotatably and nondisplaceably connected to the shaft.

The regions between the annular zones are free and are not in contact with the shaft surface. It is this which enables the cams to be pushed on without damage.

Various embodiments, variants and processes for production of the parts of the invention are described in the specification. The advantages and possibilities emerging therefrom are described below by way of example and not completely.

The cam has at least one axially projecting collar that is secured by fastening means to the shaft to prevent displacement and rotation of the cam, the annular zones preferably being in or directly adjacent to the collar region. This offers an improved possibility for the fastening or additional nonrotatable securing of the cams, and the introduction of undesired tensions in the cam region is particularly easily avoided. Groove-like indentations are provided in the shaft in the axial direction. Projections emanate from the one or more collars and extend into these indentations. The projections are preferably in the form of beads. This makes it possible to achieve an additional torsional/axial fastening of the cam to the shaft by virtue of the fact that beads on the all-round projecting collar on the cam engage the shaft.

The shaft has sections along its length that are raised relative to the bearing points and on which the cams are arranged. This certainly avoids damage to the bearing surfaces which are present between the raised shaft parts and have already been manufactured to final dimensions prior to assembly.

The cam consists of a radially inner section comprising tough, in particular plastically deformable, material and a radially outer section comprising hard, in particular, wear-resistant material. This enables tensile stresses which occur, for example as a result of the play-free fit, to be particularly readily absorbed.

The radially outer section is formed by a support layer produced on the radially inner section by carbonitriding, case hardening, induction hardening, ionitriding or gas nitriding. If necessary a hard-wearing layer (for example a CVD coating) is formed on the radially outer section. The radially outer section is provided with a sliding layer, in particular a copper or a manganese phosphate layer. The manganese phosphate layer contains molybdenum disulfide. This improves the cooperation properties of the cams with the pinion partners, increases the life and reduces friction. Preferably the collar, the inner bore, and optionally the cam sidewalls are covered in the various hardening processes.

Because, according to the invention, the cams can be manufactured individually to final dimensions, modern methods can be used for the sliding and wear layers on the radial cam surface, for example CVD methods (carbon vapor deposition) or ionitriding. The hard layer thickness is about 10 m. Depending on the method, temperatures of 300°–550° C. must be expected.

In certain cases, it may be advantageous to apply a sliding layer to the radial support layer instead of a hard wearing layer. The sliding layer promotes running in of the pinion partners relative to one another and prevents premature wear of one of the two pinion partners. The sliding layer is as a rule produced by a wet chemical treatment, which is more economical than the thin hard layer process. The layer thickness is about 10 m. The sliding layer used is, for example, a manganese phosphate layer. In addition, a molybdenum disulfide, for example Molykott, can be incorporated in the manganese phosphate crystal structure by a wet treatment, which further improves the emergency running properties of the entire cam drive.

The radially inner section consists of alloyed, precipitation-hardened aluminum and preferably has a hard-wearing layer—for example a CVD coating. This gives an extremely light construction.

Instead of a bead connection on the collar, at least one connecting pin passing through the collar fits with a tight fit in an indentation arranged in the shaft. This is an alternative to indentations on the shaft and bead-like projections on the collars, although combinations would also be possible. In particular, it optimally prevents axial displacements of the cams. It is preferably used in small series.

As another alternative connection, the cam, in particular its collar, is fastened on the shaft by means of a welding method producing at most slight tensions. The welding method is laser welding. This is preferred when the cam body consists of low-carbon steel (carbon content 0.3%) and large series have to be produced. An all-round or segmented weld seam is possible: the welding parameters of the welding process are such that material splashes and permanent deformation due to the resulting local heating are avoided.

A process for the production of a radially outer section of the cam includes producing a hard, in particular wear-resistant, layer or coating on the radially inner surface, wherein the bore and the collar, and if necessary the side surfaces of the cam are covered during production. This prevents unnecessary material consumption and unnecessary stiffening of zones which have to remain relatively flexible.

The following should in principle be noted with regard to assembly: after the cams and the shaft have been produced to final dimensions and the cams have also been treated with a corresponding hard layer or sliding layer, in a first operation the cams are pushed onto the shaft individually in succession according to their annular and axial position. The cams are held on the shaft as a result of the transition fit. The additional torsional/axial fastening of the cams to the shaft is carried out in a second operation. To meet the various requirements set for a cam drive (sliding or rolling drive), various torsional/axial fastenings are possible for the purposes of the invention but only three are described in detail. Their use depends on cam dimensions and their attachment zones, the formation of the collar of the cam and the cam material used.

After one of the fastening methods has been carried out, the camshaft is completed in a further operation in which any end pieces are generally forced onto journals of the shaft or directly onto the shaft. These end pieces too are manufactured to final dimensions prior to assembly. In a further operation, a control operation can be added if necessary. The total assembly of the camshaft is carried out on an assembly line. When the camshafts leave the assembly line, they are ready for installation without additional machining.

As a process for machining a small mismatch tolerance of the inner bore of a cam for a camshaft manufactured to final dimensions, a plurality of cams are placed with the same orientation on a hydraulic spindle and then machined together by grinding and, if necessary, also microfinishing.

Description of the Drawings

Further details of the invention are evident from the following description of preferred embodiments shown schematically in the accompanying drawings, in which:

FIG. 1 shows a view of a camshaft formed according to the invention, in the assembled state, in which FIG. 2 shows a view of the shaft with pressed-in end pieces but without cams, the left side showing groups of longitudinal grooves;

FIGS. 3–5 each show a section through the line III—III. of FIG. 1 with different fastening methods and FIGS. 3a–5a each show a longitudinal section through the line III.a—III.a to V.a—V.a of the relevant FIGS. 3 to 5;

FIGS. 6–9 each show an enlarged axial section of the cam hollow shaft having different transition fits;

FIGS. 10–12 show an advantageous embodiment of a process step carried out according to the invention, FIG. 10 and FIG. 12 showing an enlarged section of FIG. 3a and FIG. 11 showing a section through the line XI—XI and FIG. 13 shows cams clamped in packets on a spindle.

DETAILED DESCRIPTION OF PREFERRED EMBODIMENTS

According to FIGS. 1 and 2, a shaft which serves as a camshaft and is preferably hollow has two end pieces 1, 15 which are pressed into its hollow ends. Bearing, limiting and spacing rings 2, 2a, 12, 13 which are mounted—generally pressed—onto the particular end piece 1, 15 or onto the shaft 3 in any manner known per se.

Cams 4 to 11 surrounding the shaft 3 in an annular manner and, if necessary, also a spacing ring 13 are mounted on the shaft 3 at appropriate distances.

The shaft 3 (FIG. 2) has zones of different diameters along its longitudinal axis. The zones 39 represent bearing points of the camshaft and the zones 40 are zones on which the cams fit. The zones 40 are raised relative to the zones 39 in order to avoid damage, for example by pitting, when the cams are pushed on. To achieve efficient production of the shaft 3 by centerless plunge-out grinding, it is necessary to separate the parts over the largest dimensions of the shaft 3—in this case zones 40—of. FIG. 1: sealing ring 2, longitudinal limit 12, 13, intermediate ring 2a—i.e. the core structure, from the shaft and to manufacture these to final dimensions as separate parts and finally to mount them—as a rule by pressing on.

After the centerless plunge-cut grinding, the shaft 3 is ready for assembly and requires no further machining when in the form of an assembled camshaft following assembly. This applies in particular to the three torsional axial fastenings described in detail with respect to FIGS. 3–5, but, for the variant according to FIG. 3, the securing longitudinal grooves 16, as indicated in FIG. 2, must be made prior to centerless plunge-cut grinding. The grooves 16 are made, for example on an automatic rotary cutter or groove cutter. According to the invention, both axial ends of the groove 16 are limited by a spherical groove base 22, which is necessary to ensure axial support (limitation) after beading of the collar 19 of the particular cam.

FIG. 6–9 each show a cam 4–11 in the longitudinal section through the cam projection, cam bore and shaft 3 as far as the central axis Y thereof. The line X is an axis of symmetry with respect to the cam width.

In a sliding drive, high geometric requirements are set for the cam, for example the cam must be absolutely flat and parallel to the axis, i.e. the adjacent tappet base must make linear contact (not a wavy line) with the total width of the cam. In accordance with the requirements of the selected cam guide, the cams and their connecting zones Z with the shaft 3 must be correspondingly dimensioned.

The dimensional design is also influenced by the choice of the material, as well as the fixing connection to be chosen for the collars.

The formation of the cam is shown in FIG. 6–9. The cam 4–11 has a play-free transition fit on the shaft 3, the additional fixing connection not being shown. The annular cam body with the cam projection has a surrounding collar 19 on the end face (FIG. 6 and 7) on both sides and on one side (FIG. 8). FIG. 9 shows a cam without a surrounding collar. The inner core 17 of the cam, including the collar 19, consists of tough material which is plastically deformable in the region of the collar, and has a hard support layer 18 and, for a sliding drive, a hard wearing layer or a sliding layer zone 20.

For example, the following materials may be used: alloyed and unalloyed case hardened steels, nitride steels, sintered materials and cast irons. By means of a suitable thermal treatment, depending on the material chosen, a sufficiently hard and thick support layer 18 is formed, for example by case hardening, carbonitriding, induction hardening or ionitriding. The wearing layer 20 is formed, for example, by methods such as CVD coating or ionitriding or, if a sliding layer zone is sufficient, this is more economically produced in the form of a hard layer, for example pure manganese phosphating or additional molybdenum incorporation in the support layer.

According to the invention, it is also possible to use light structural methods instead of steel materials for the cams 4–11. This appears useful in the case of sliding drives if it is possible considerably to reduce the load on the cams, for example by reducing the valve driving mass, and it is thus possible to achieve, between the pinion partners, pressures which permit the use of, for example, alloyed precipitation-hardened aluminum materials. In combination with a hollow shaft instead of a cast iron camshaft, the weight of an assembled camshaft can be reduced by more than 50%. In the case of aluminum alloys, the support layer 18 is dispensed with but coating with a wearing layer must be effected, for example CVD coating.

According to the invention, the formation of the design of the bore of the annular element 4–11 is very important. The cam 4–11 must fit without play on the shaft 3. There must be no impermissible eccentricity of the bore seat zone Z for the radial cam and no tensions which result in a distortion of the cam surface in the axial direction, i.e. no impairment of the flatness. This is particularly important in sliding drives. Pitting of the shaft in the region of the bearing points 39 is avoided, additional fixing is present and mounting of the cam 4–11 on the shaft 3 is ensured without subsequent machining of the assembled camshaft.

FIG. 6 shows an embodiment which meets the above-mentioned requirements. The annular cam body has projecting all-round collars 19 at both its end faces. In order on the one hand to ensure good support surface (guidance), the tight fit zones Z are located in the region of the collar, as far as possible at the outermost edge. On the other hand, the resulting geometric deformations, due to the differences between the diameter of the cam bore and the external diameter of the shaft 3 in the region 40, can be absorbed and have a maximum overlap on 6/100 mm, so that no dimensional changes occur in the cam. In order to avoid tensions in the cam core, but also to keep the displacement forces within limits, the bore is free, i.e. there is a zone 21 in which the shaft is not in contact with the cam.

In FIG. 7–9, there is a common feature in the arrangement of the fit zones Z in the cam bore. The zone Z present per end face in the bore lies with its outer limit flush with the end face of the cam body. The shift of the fit zones Z towards the symmetry line X results, for the same overlap of bore/outer diameter as in FIG. 6, in a significantly greater radial tension in the connection partners in the contact zones, due to the thicker wall of the cam compared with, for example, the collar 19 according to FIG. 6. In addition, the hard support layer acts as a reinforcement. To prevent the displacement forces, the radial tensions and any pitting of the two connection partners, the maximum geometric overlap of the connection partners must be reduced by about 25%. The tolerance class must be refined from 7 to 6. With this solution, dimensional changes after assembly must be expected in the case of the cam. In the region without a cam projection, the diameter increases approximately by half the overlap, for example the external diameter of the cam increases by about 2/100 for an overlap of 4/100, which however is within the tolerance in this example.

This is as a rule permissible, and this increase in diameter can be counteracted during grinding of the cam. The disadvantage of this embodiment is that flatness is not obtained in the axial direction up to the beginning of the cam projection in the external diameter region of the cam, i.e. the cam line has irregularities in the region of the symmetry line X, for example the surface is concave there (for example in the case of thin walls).

In order substantially to eliminate this sagging, an additional fit zone Z can be provided around the symmetry line.

The contact-free zones 21 in the bore are in the collar zone as well as in the annular cam part. This embodiment is suitable in particular for roller drives. Here, absolute flatness of the cam in the axial direction is not required since the adjacent roller is in any case convex in the region of the symmetry line X.

An advantage of the embodiment according to FIG. 7 is that the resulting higher radial tension increases the securing against displacement and rotation between the connection partners and lower requirements are thus set for the connection providing additional fixing. This possibility is utilized in the embodiment according to FIG. 8. It is sufficient for the cam to have only one all-round collar 19 to ensure the additionally fixing connection according to FIG. 3. Mounting only one collar 19 results in more advantageous production costs per cam, and only one row of 16 grooves is required on the shaft 3 per cam.

The embodiment according to FIG. 9 shows a variant. No projecting all-round collar 19 is present at the end face of the annular cam body 4–11. However, the cam bore corresponds to the embodiment in FIGS. 7 and 8. The additionally fixing connection can be implemented only with the features according to FIG. 5, i.e. by laser welding. To guarantee crackfree welding, only low-carbon materials can be used, i.e. the carbon content should be <0.3% (case hardened steels). Furthermore, this embodiment is predominantly restricted to roller drives, for reasons such as those mentioned with regard to FIG. 7. In special cases, this embodiment may be the most economical solution, provided that all functional parameters can be fulfilled.

The cam is produced by known methods. Production of the blank is effected, for example, by the use of the following methods: hot extrusion, semicold extrusion and, in the case of materials having a low carbon content, by cold extrusion, and, if suitable materials are available, also by sintering methods and sinter forging.

The necessary machining of the cam blanks, in particular the bore and collar part, is carried out on known automatic turning machines, and it is advantageous to clamp the cam at its outer contour in order to obtain narrow mismatch tolerances.

If the support layer 18 is formed, for example, by case hardening or induction hardening, this operation must be carried out before the fit bore is machined to final dimensions.

The cams are then ground on a cam grinding machine. The joining method proposed here, according to the invention, permits for the first time grinding of the cam as a packet. For this purpose, the cams 4–11 are uniformly oriented and clamped on a common hydraulic spindle according to FIG. 13. In order further to increase the cost-efficiency, to reduce the relatively long nonproductive times which occur during spindle change, including cam positioning, i.e. to halve these, it is expedient to design the spindle 28 double-sided, which however requires that it has a support 29 in the middle. Cam grinding can thus be carried out by an alternating method. Depending on the width of the cam, including any projecting collar 19, for example, 4–8 cams per spindle per side, i.e. 8–16 cams, can be ground in one chucking operation. This packet grinding permitted by the joining method results in an important reduction in the machining times and hence in the production costs, and massive savings in investment costs for the special cam grinding machines. Owing to the invention, only about one eighth of the previously required investment costs is now necessary.

After the cams 4–11 have been ground to their final dimensions, they are—if necessary—subjected to microfinishing on the same hydraulic spindle 28. If necessary, the hard wearing layer or the sliding layer is then applied. The cams 4–11 can now be pushed on to the correct position on the shaft 3 in a first operation, as already mentioned.

In a second operation, the additionally fixing connection of the cams 4–11 to the shaft 3 is effected. For example, three inventive variants are available for the additionally fixing connection, as shown in FIGS. 3, 3a; 4, 4a; 5, 5a. A preferred fixing connection is shown in FIGS. 3, 3a, and an enlargement thereof in FIGS. 10 and 11.

In order to ensure that the cams 4–11 are connected to the shaft 3 so that they are radially nonrotatable and axially nondisplaceable, the said shaft has—as shown in FIGS. 2 and 3a, a number of groups of trough-like grooves 16 distributed over the circumference of the shaft 3. The groove base 22 (FIG. 10) is formed by an arc. The number of grooves which are made in a plane radially along the circumference of the shaft should amount to at least three grooves. An even number of grooves permits opposite simultaneous beading 37 in one operation, so that the radially acting forces which occur as a result of the deformation of the collar are absorbed.

The connection is described with reference to FIGS. 10 and 11. FIG. 10 shows a longitudinal section of a cam 4–11 pushed on the shaft 3 in a first operation, with 2 collars and cam bore according to FIG. 6 (only one half shown), which is brought to the required angular and longitudinal position. The collar 19 of the cam now brought to its position has its bead inserted into the groove 16 in a second operation, as illustrated in FIGS. 10 and 11, and is hence undetachably joined radially and axially.

FIG. 10 furthermore shows a beaded collar zone 19a, the bead punch 36, the position for beading 37a and the beaded collar zone 37. FIG. 11 shows a section through FIG. 10. The punch 36 is held in a tool holder, as indicated by the contour 41. The punch is V-shaped in the axial direction; the shape of its bevel takes into account the groove width of the groove 16 as well as the double wall thickness of the collar 19, which results during beading.

FIG. 12 substantially corresponds to FIG. 10. The difference is that the representation shows a cam having an all-round collar 19, and the cam bore corresponds to that in FIG. 8. In order to achieve the axial nondisplaceability of the cam having a collar, it is necessary to increase the collar length by about 50% and move the midpoint of the limiting arc (groove base 22) approximately to the middle of the collar length. The tight fit zones Z corresponding to FIG. 8 are added, including the free space 21.

Beading according to FIG. 10-12 is achieved by pressing the material of the collar 19 by means of a punch 36 into the groove 16 of the shaft 3, which groove is located under the punch; the collar is thus pushed into the groove until the collar material rests against the arc-shaped groove base 22 and against the groove sides without play. The resulting radial forces which occur during shaping of the collar 19 and which act on the shaft 3 could cause permanent deformation of the shaft 3. In order to prevent this, the resulting forces are absorbed by interlocking half-shells which are present directly below the collar part as well as partially below the shaft.

FIG. 3 and 3a show a shaft 3 on which a cam 4–11 is mounted and fastened. Collar 19 and bore variants according to FIG. 6–8 permit this connection.

According to FIG. 4, 4a, its collar 19 is fixed by an alignment pin 42 which is pushed into a hole in the shaft 3. For safety reasons, 2 alignment pins should be provided.

FIG. 5 and 5a represent a further possible method of fastening, in which the weld seam 43 connects the shaft 3. Collars and bore variants according to FIG. 6 and 9 are suitable. Suitable welding methods are all welding methods which manage with as small a heat effect as possible and hence rule out distortion of the shaft 3, for example laser welding methods.

I claim:

1. In combination, a shaft manufactured to final dimensions and at least one cam, with a radial central plane, surrounding said shaft in an annular manner and manufactured to final dimensions, wherein said cam has an inner bore with at least two axially separated annular zones of material, for providing a solderless play-free transition fit on said shaft, which annular zones are separated from one another by at least one free and empty space in said inner bore, providing internal stress relief in said cam, which space is arranged symmetrically with respect to said radial central plane of said cam.

2. Combination as claimed in claim 1, wherein said cam has at least one axially projecting collar and fastening means for securing said collar to said shaft for preventing displacement and rotation of said cam shaft.

3. Combination as claimed in claim 2, wherein said cam has two axially projecting collars, one on each side of said cam, and each of said annular zones is in the region of one of said axially projecting collars.

4. Combination as claimed in one of claims 1 to 3, wherein said shaft has zones on which said cams are arranged and bearing zones and sections that are lower relative to said zones on which said cams are arranged.

5. Combination as claimed in claim 2, wherein said shaft has groove-like indentations in its axial direction and projections emanating from said collar project into said indentations.

6. Combination as claimed in claim 5, wherein said projections are in the form of a bead.

7. Combination as claimed in claims 2, wherein said fastening means comprises at least one recess in said shaft and at least one connecting pin that passes through said collar for a tight fit in said recess.

8. Combination as claimed in claim 2, wherein said fastening means comprises weld means that produce, at most, slight tensions.

9. Combination as claimed in claim 2, wherein said fastening means comprises laser weld means.

10. Combination as claimed in claim 1, wherein said cam comprises a radially inner section of tough, plastically deformable material and a radially outer section of hard material that is different material than said plastically deformable material of said radially inner section.

11. Combination as claimed in claim 10, wherein said hard material is wear-resistant.

12. Combination as claimed in claim 10, wherein said radially inner section comprises alloyed precipitation-hardened aluminum.

13. Combination as claimed in claim 12, wherein said radially outer section comprises a wearing layer on said radially inner section.

14. Combination as claimed in claim 13, wherein said wearing layer comprises a CVD coating.

15. Combination as claimed in claim 10, wherein said radially outer section comprises a support layer formed on said radially inner section by a process selected from carbonitriding, case hardening, induction hardening, ionitriding and gas nitriding.

16. Combination as claimed in claim 15, wherein said radially outer section further comprises a wearing layer on said support layer.

17. Combination as claimed in claim 16, wherein said wearing layer comprises a CVD coating.

18. In combination, a shaft manufactured to final dimensions and at least one cam surrounding said shaft in an annular manner and manufactured to final dimensions, said cam having a radially inner section of tough, plastically deformable material and a radially outer section of hard material that is a different material than said plastically deformable material of said radially inner section, wherein said radially outer section comprises a support layer formed on said radially inner section by a process selected from carbonitriding, case hardening, induction hardening, ionitriding and gas nitriding and said radially outer section further comprises a sliding layer on said support layer selected from a copper layer and a manganese phosphate layer.

19. Combination as claimed in claim 18, wherein said manganese phosphate layer contains molybdenum disulfide.

20. Process for the production of a radially outer section on a cam, said cam surrounding a shaft in an annular manner and manufactured to final dimensions, said cam having an inner bore, a collar, a radially inner section of tough, plastically deformable material and a radially outer section of hard material that is a different material than said plastically deformable material of said radially inner section, comprising covering said inner bore and said collar on said cam, and producing a hard layer on said radially inner surface of said radially inner section.

21. Process according to claim 20, further comprising covering the side surfaces of said cam in addition to said inner bore and said collar.

22. Process for machining a small mismatch tolerance on the inner bore of a plurality of cams for a camshaft manufactured to final dimensions, said cams surrounding said camshaft in an annular manner and manufactured to final dimensions, comprising placing said plurality of cams with the same orientation on a hydraulic spindle, and machining said plurality of cams together by grinding.

23. Process according to claim 22, further comprising microfinishing said cams.

* * * * *